United States Patent [19]

Bouplon

[11] 3,982,609
[45] Sept. 28, 1976

[54] AIR LINE LUBRICATOR

[75] Inventor: Edward J. Bouplon, Cochranton, Pa.

[73] Assignee: Chicago Pneumatic Tool Company, New York, N.Y.

[22] Filed: July 7, 1975

[21] Appl. No.: 593,640

[52] U.S. Cl. .............................. 184/56 A; 222/193; 239/373
[51] Int. Cl.² .......................................... F16N 7/34
[58] Field of Search ................. 184/56 R, 56 A, 57, 184/58, 59, 55 R, 55 A, 50 R, 50 A; 222/193

[56] References Cited
UNITED STATES PATENTS

| 1,520,023 | 12/1924 | Haight | 184/55 A |
|---|---|---|---|
| 1,851,602 | 3/1932 | Terry | 184/55 A |
| 2,710,672 | 6/1955 | Costes | 184/55 A |
| 2,710,673 | 6/1955 | Costes | 184/55 A |

FOREIGN PATENTS OR APPLICATIONS

| 568,322 | 12/1923 | France | 184/56 R |
| 688,821 | 5/1930 | France | 184/56 R |
| 322,955 | 12/1929 | United Kingdom | 184/55 A |
| 896,164 | 5/1962 | United Kingdom | 184/55 A |

*Primary Examiner*—Richard C. Pinkham
*Assistant Examiner*—Arnold W. Kramer
*Attorney, Agent, or Firm*—Stephen J. Rudy

[57] ABSTRACT

A lubricator for feeding oil from a reservoir into a live air stream passing through a supply line to a pneumatic tool. The lubricator includes a passage of uniform diameter connectible at opposite ends into the supply line, and has within the passage in the path of air flow a teardrop formed air deflector functioning to cause differential pressures to develop through a pair of connected tubes in the reservoir, whereby oil is forced from the latter through one of the tubes into the air stream. One of the tubes is manually adjustable so as to cause a variation in the differential pressures and a consequent variation in the oil volume discharged into the reservoir.

8 Claims, 5 Drawing Figures

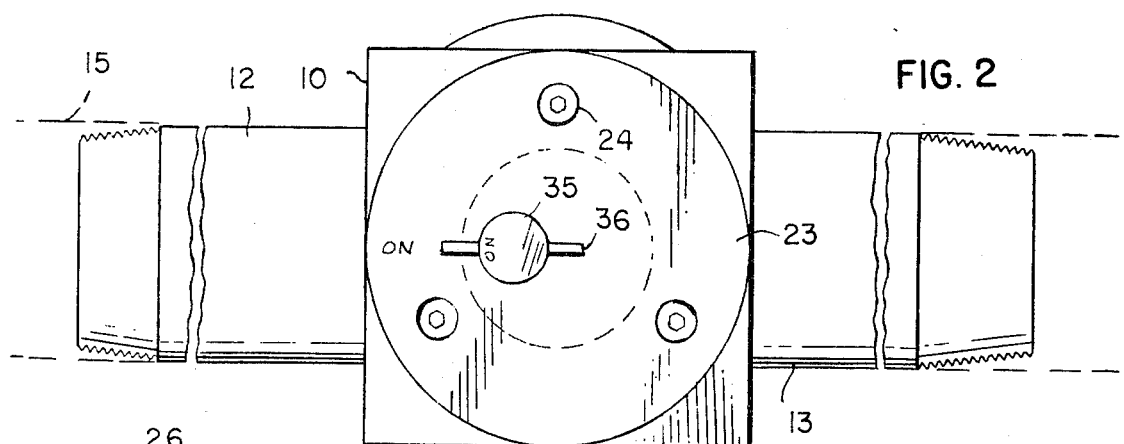
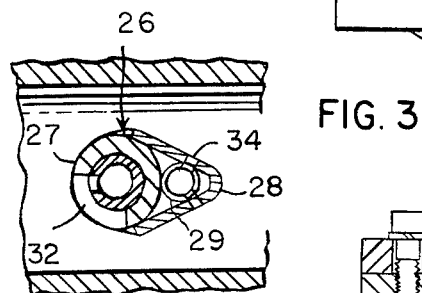
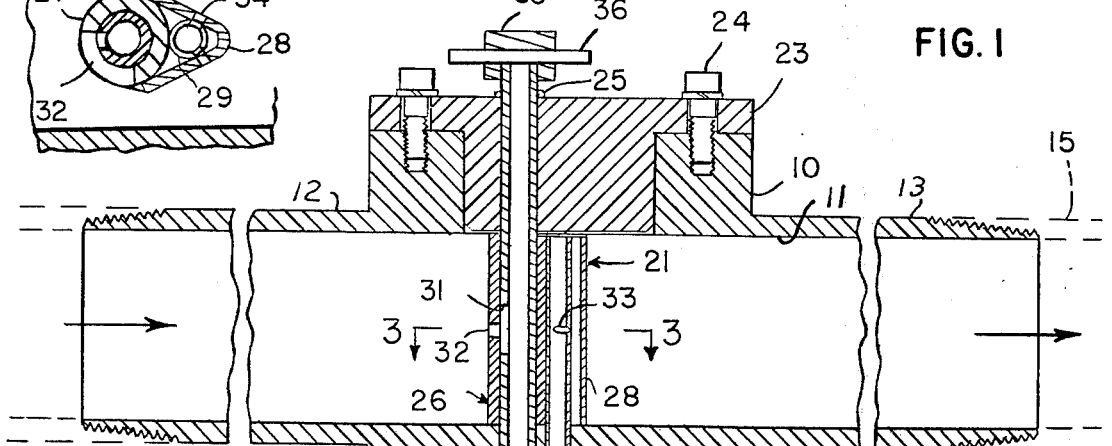
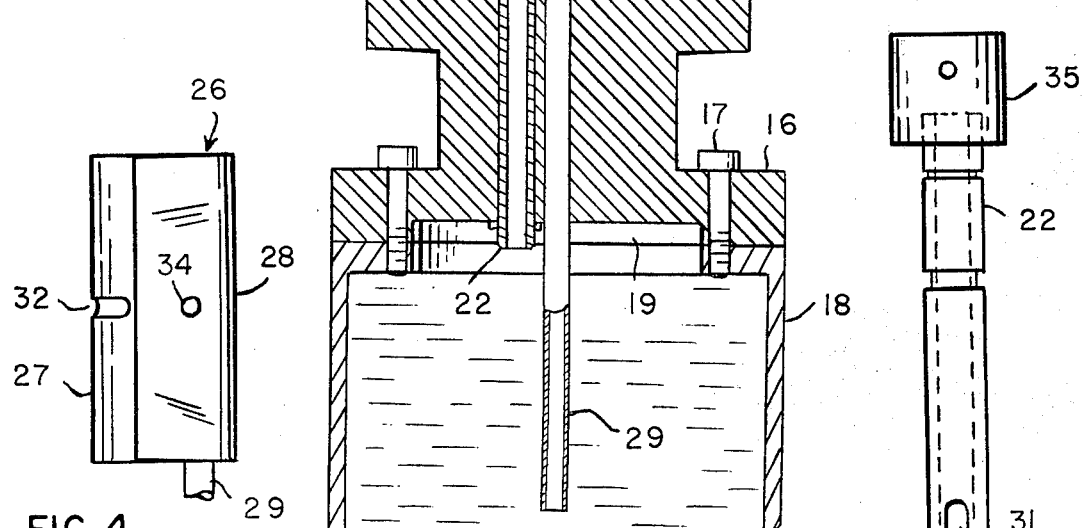

AIR LINE LUBRICATOR

BACKGROUND OF THE INVENTION

This invention relates to air line lubricators such as are connected in lines feeding operating air to pneumatically operable machinery, such as rock drills and other pneumatically powered tools.

A general object is to provide an air line lubricator of an improved nature which is rugged in its construction, enables high oil flow, is economical to manufacture, and provides a simplified means for regulating the oil flow.

A feature of the invention lies in the structure of the device whereby it includes an air flow passage of uniform diameter corresponding in diameter to that of the supply line. This avoids undesirable line flow losses and the loss of tool efficiency that might otherwise develop where there is a reduction in the diameter of the air flow passage.

Another feature lies in the structure and organized arrangement of its components whereby it is rendered economical to manufacture.

A still further feature lies in efficient and practical means for selectively regulating the volume flow of lubricating oil into the air flow passage.

These and other features, as well as the advantages flowing therefrom, will become more apparent as this disclosure proceeds in greater detail with reference to the accompanying drawing.

BRIEF DESCRIPTION OF THE DRAWING

In the accompanying drawing:

FIG. 1 is a view in longitudinal section of an air line lubricator embodying the invention;

FIG. 2 is a top plan view of FIG. 1;

FIG. 3 is a section on line 3—3 of FIG. 1;

FIG. 4, is a detail in side elevation of the teardrop element shown in FIG. 3; and FIG. 5 is a fragmentary detail of the pressure control tube.

DESCRIPTION OF PREFERRED EMBODIMENT

The air line lubricator illustrated in the drawing as embodying the invention includes a body 10 having a linear air flow passage 11 extending longitudinally through a pair of aligned pipe nipples 12, 13 extending integrally from opposite sides of the body. The pipe nipples are adapted by threads for coupling the lubricator in a supply air line 15 leading to a pneumatically operable device, such as a rock drill or the like. As indicated by the arrows, the nipple 12 serves as an inlet from the source of air supply to the passage 11 in the lubricator; and the nipple 13 serves as an outlet from the passage to the connected tool.

The body 10 has a mounting flange 16 about its base mounted, as by a group of bolts 17 to the top of an oil tank or reservoir 18. The body has a recess 19 in its base end so as to ensure an air space above the fluid in the reservoir.

Means generally indicated at 21 (FIGS. 1, 3) is incorporated into the body 10 for effecting a controlled pressurization of the oil in the reservoir and, as a consequence, causing the oil to be forced into the lubricator passage 11 and mixed with the supply air flowing through the passage.

The means 21 includes an air pressure control tube 22 supported in the body for relative rotation, and extending radially through the passage 11. The lower end of the tube depends slightly below the base of the body into the upper area of the reservoir. The upper end of the tube projects vertically through a cap plug 23 fitted in an access hole opening radially into passage 11. The cap plug is removably secured in place by bolts 24.

The tube, which has been slidably inserted into the body, is retained in place against endwise displacement by retaining rings 25 mounted at opposite ends thereof.

Within the passage 11 in the path of air flow is disposed a teardrop formed air deflector element 26. Through the larger diameter portion 27 of the teardrop element the tube depends with a slide fit, and has relative rotation. The teardrop portion 27 is in the form of a sleeve serving as a bushing for the tube. Fixed in a nosepiece defining the tapered portion 28 of the teardrop element is an oil discharge second tube 29. This tube depends with a slide fit through the lower portion of the body 10, and projects below the base of the latter so as to depend deeply into the oil reservoir. The nosepiece 28 of the teardrop element is defined by means of a sheet of metal of V-form, the legs of which are welded to opposite surface areas of the sleeve portion 27, as best shown in FIG. 3.

The two tubes 22 and 29 are positioned in parallel closely spaced relation to each other, the control tube being forwardly of the discharge tube toward the inlet end of passage 11. The vertical axes of both tubes perpendicularly intersect the horizontal or longitudinal axis of passage 11.

The control tube 22 has in its side wall a vertically extending port 31 which is registrable with a laterally or horizontally extending port 32 formed in the side wall of the bushing portion 27 of the teardrop element; and the discharge tube 29 has a pair of side ports 33 registering with ports 34 in corresponding sides of the nosepiece. The several ports, 32, 33, 34 are desirably at the level of the longitudinal axis of passage 11.

The control tube 22 is open at its bottom; and is closed at its top end by means of a cap 35. The cap is provided with a diametrically extending stem 36, which is manipulative by the operator to selectively rotate the control tube relative to the body 10 and to the teardrop element so as to adjust the angular degree of registration of port 31 in the tube with the port 32 in the teardrop element. The spaced position of both tubes in the body of the lubricator and in the teardrop element restrains the latter from rotating with the control tube.

It is to be noted that the outer surface of the sleeve or greater diameter portion 27 of the teardrop element faces the inlet 12 of passage 11, and the oppositely located rounded vertex end of the nosepiece 28 faces the outlet end 13 of passage 11. The lateral port 32 in the teardrop element is preferably located in the southwest quadrant or third quarter of the sleeve, as best seen in FIG. 3. The outer or greater diameter 27 of the teardrop element is relatively smaller than the inner diameter of passage 11 so as to allow inlet air to flow freely around the teardrop element to the outlet 13.

The teardrop element, disposed as described in the path of air flow in passage 11, causes in its deflection of the inlet air flow differential air pressures to develop in the tubes 22 and 29, with a greater pressure developing in the control tube 22 than in the discharge tube 29. This causes the oil in the reservoir to be pressurized by some of the inlet air entering into the control tube through the registered ports 31, 32; and causes the pressurized oil to be forced or drawn through the discharge tube and aspirated or discharged in a fine spray through the small side ports 33, 34 into the inlet air stream.

In summary of the operation of the air line lubricator: The lubricator has an "Off" position when the port 31 in the control tube is not registered with the port 32 in the teardrop element. When the ports are in registration, the differential pressure developing in the control tube relative to that pressure developing in the discharge tube will progressively diminish accordingly as the port 31 in the control tube is carried by angular adjustment of the control tube from an "On" position (FIGS. 2, 3) at the starting end of the 90° port 32 to a position 90° removed at the opposite end of the latter port. This is understandable in that, when the control tube port 31 is at the starting end (FIG. 3) of the port 32, it is on a direct line with or intersected by the longitudinal axis of the air flow through passage 11 so as to receive the full pressure or force of the inlet air stream. As the control tube port 31 is angularly adjusted or moved counterclockwise (FIG. 3) further away from the starting end, the pressure developing in the control tube diminishes; and when the control tube port 31 is registered with the terminal end of port 32 adjacent the 2nd quadrant of the bushing, the pressure differential developing in the control tube is further reduced.

As long as the control port 31 and teardrop element port 32 are registered, whether the registration be closer to one end or the other of port 32, the pressure differential in the control tube will be greater than that developing in the discharge tube. This is because of the location and registration of the ports 33 of the discharge tube with the ports 34 in the tapered sides of the nosepiece, where a partial vacuum or low pressure develops because of the high velocity of the air stream flowing through the passage 18 as it leaves the opposed surfaces of the wider diameter sleeve portion 27 of the teardrop element.

It is understandable that the greater the differential pressure developing in the control tube 22, the greater will be the oil flow through the discharge tube 29 into passage 11; and as the differential pressure is reduced by angular adjustment of the control tube, the oil flow into passage 11 is reduced accordingly.

It is understood that seal rings may be provided where needed to seal against leakage from passage 11 around the plug cap 23 and around the tubes 22 and 29.

What is claimed is:

1. A lubricator, for feeding oil into a live air stream passing through a supply line to a pneumatic tool, comprising a body having a base mounted atop an oil reservoir and having side inlet and outlet ends connectible in a live air supply line, a linear passage of uniform diameter extending through the body from the inlet to the outlet end, a first tube in the body extending radially through the passage having an open bottom end projecting from the base of the body into an upper area of the reservoir proximate the surface of the oil therein and having a closed top end projecting externally of the body, a port opening out of a side area of the tube into the passage facing in the direction of the inlet end of the passage, a second tube in the body extending radially through the passage in parallel relation to the first tube but to the outlet side of the passage, the second tube having an open upper end disposed in close proximity to the wall of the passage and having an open bottom end projecting from the base of the body beyond the first tube into the oil within the reservoir, ports opening out of side areas of the second tube within the passage in opposed spaced relation to the wall of the passage, and air flow interference means disposed within the passage in surrounding relation to both tubes for causing impingement in part of an inlet air stream in the passage substantially directly into the port of the first tube and for causing the air stream in part to flow over the ports of the second tube toward the outlet end of the passage.

2. A lubricator as in claim 1, wherein the diameter of the passage corresponds to that of the supply line.

3. A lubricator as in claim 1, wherein the first tube is rotatable relative to the body, and manipulative means is provided on the top end of the first tube for rotating the tube angularly to vary the position of the port in the first tube angularly relative to the longitudinal axis of the passage.

4. A lubricator as in claim 3, wherein the air flow interference means is an element of large tear drop configuration having a stationary sleeve defining a large diameter portion thereof surrounding the first tube within the passage provided with an angularly extending port in its side facing the inlet end of the passage with which port the port in the first tube is registrable in selective angular adjustments of the first tube extending through a range of 90°.

5. A lubricator for feeding oil into a live air stream passing through a supply line to a pneumatic tool, comprising a body having a base mounted atop an oil reservoir and having side inlet ends connectible in a live air supply line, a linear passage of uniform diameter extending through the body from the inlet to the outlet end, a first tube in the body extending radially through the passage having an open bottom end projecting from the base of the body into an upper area of the reservoir proximate the surface of the oil therein and having a closed top end projecting externally of the body, a port opening out of a side area of the tube into the passage facing in the direction of the inlet end of the passage, a second tube in the body extending radially through the passage in parallel relation to the first tube but to the outlet sides of the passage, the second tube having an open upper end disposed in close proximity to the wall of the passage and having an open bottom end projecting from the base of the body beyond the first tube into the oil within the reservoir, ports opening out of side areas of the second tube within the passage in opposed spaced relation to the wall of the passage, and air flow interference means disposed within the passage in surrounding relation to both tubes for causing impingement in part of an inlet air stream in the passage substantially directly into the port of the first tube and for causing the air stream in part to flow over the ports of the second tube toward the outlet end of the passage; wherein the first tube is rotatable relative to the body, and manipulative means is provided on the top end of the first tube for rotating the tube angularly to vary the position of the port in the first tube angularly relative to the longitudinal axis of the passage; wherein the air flow interference means is an element of teardrop configuration having a stationary sleeve defining a large diameter portion thereof surrounding the first tube within the passage provided with an angularly extending port in its side facing the inlet end of the passage with which port the port in the first tube is registrable in selective angular adjustments of the first tube extending through a range of 90°; and wherein a tapering nosepiece extends forwardly from the sleeve across opposite side areas of the second tube toward the outlet end of the passage, and the ports in the second tube register with corresponding ports in side areas of the nosepiece.

6. A lubricator for feeding oil into a live air stream passing through a supply line to a pneumatic tool, comprising a body having an inlet port connectible to a section of a supply line connected with a source of live air and having an outlet port connectible to a section of the supply line connected with a pneumatic tool, a passage extending longitudinally through the body of uniform diameter connecting the inlet port with the outlet port, the body having a base mounted over an open top end of an oil reservoir, a first tube extending transversely of the longitudinal axis of the passage of the body through the base into the reservoir and having a port in its side wall opening into the passage and facing the inlet end of the passage, a second tube extending transversely of the longitudinal axis of the passage in parallel relation to the first tube but to the outlet side of the passage through the base into the reservoir beyond the first tube and having ports in its side wall opening into the passage in opposed relation to the wall of the passage, a structure of teardrop form disposed in the passage about both tubes, the structure having an enlarged radius at one end facing the inlet end of the passage and having a section tapering from the enlarged radius toward the outlet end of the passage, the enlarged radius end being smaller than the diameter of the passage, the first tube extending axially through the enlarged radius end of the structure, the enlarged radius end having in its side an angularly extending port opening into the passage, the first tube having relative rotation so as to bring the port in its side into and out of registration with the angularly extending port, manipulative means mounted upon an externally projecting top end of the first tube for selectively rotating the tube relative to the angular port, and the tapering section having ports in its sides registering with the ports in the second tube.

7. A lubricator as in claim 6, wherein the angular port extends for substantially 90° from a point proximate the longitudinal axis of the passage.

8. A lubricator as in claim 6, wherein the passage corresponds in diameter to that of the supply line.

* * * * *